United States Patent Office 3,091,633
Patented May 28, 1963

3,091,633
SUBSTITUTED AND UNSUBSTITUTED SALICYL-
ANILIDE N-LOWER ALIPHATIC CARBONATOR
Richard E. Strube, Kalamazoo, Mich., assignor to The
Upjohn Company, Kalamazoo, Mich., a corporation of
Delaware
No Drawing. Filed Nov. 15, 1961, Ser. No. 152,658
5 Claims. (Cl. 260—480)

This invention relates to new and useful chemical compounds and more particularly to substituted salicylanilide carbamates which are pharmacologically useful as anti-inflammatory agents.

The novel compounds of the present invention are represented by the following structural formula:

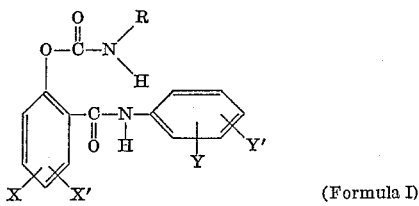

(Formula I)

wherein R is a member selected from the group consisting of alkyl of from 1 to 4 carbon atoms inclusive, and alkenyl of from 3 to 4 carbon atoms inclusive.

X and X' are members selected from the group consisting of hydrogen, halogen, alkyl of from 1 to 4 carbon atoms inclusive, and alkoxy of from 1 to 4 carbon atoms inclusive, and Y and Y' are members selected from the group consisting of hydrogen, halogen, alkyl of from 1 to 4 carbon atoms inclusive, and alkoxy of from 1 to 4 carbon atoms inclusive.

Representative groups within the scope of the present invention include: alkyl, e.g., methyl, ethyl, propyl, and butyl; alkenyl, e.g., allyl, methallyl and crotyl; alkoxy, e.g., methoxy, ethoxy, propoxy and butoxy; and halogen, e.g., fluoro, chloro, bromo and iodo.

The starting materials for the preparation of the compounds of the present invention are a salicylic acid of the formula:

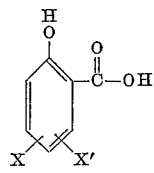

and an aniline of the formula:

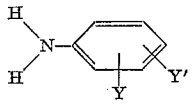

wherein X, X', Y and Y' are as hereinbefore defined.

The salicyclic acid, or a derivative thereof, is condensed with aniline, or a derivative thereof, to provide salicylanilide, or the respective derivatives, of the formula:

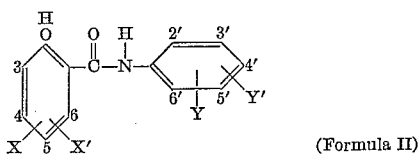

(Formula II)

wherein X, X', Y and Y' are as hereinbefore defined.

The condensation of a salicyclic acid and an aniline of the above formulae is easily accomplished by several known methods, e.g., heating equimolar amounts of the two compounds together, in the presence of phosphorus trichloride if desired. Similarly salicylic acid esters such as methyl salicylate and phenyl salicylate can be used as starting material in the place of the salicylic acid.

An alternative method of preparation useful to prepare salicylanilide and the non-halo derivatives thereof is by the condensation of salicylamide or non-halo derivatives thereof with bromobenzene or non-halo derivatives thereof, by heating in the presence of sodium acetate and copper powder.

Compounds of the present invention of Formula I are readily prepared by reacting compounds of the Formula II with an alkyl or alkenyl isocyanate, for example, methyl, ethyl, propyl, isopropyl, butyl, isobutyl, allyl, methallyl and crotyl isocyanate, in the presence of an inert organic solvent, for example, diethyl ether, diisopropyl ether, dioxane and the like. The reactants are preferably mixed in equimolar proportions, but, if desired, an excess of either reactant can be used. The reaction proceeds at temperatures between about 15° C. and about 100° C. and can be accelerated by adding a small amount of a base such as triethylamine. Illustratively, carbamates are readily obtained by allowing the reaction mixture, including a base such as triethylamine, to stand overnight at about 25° C. The product is recovered by conventional means such as filtration or concentration of the reaction mixture followed by filtration, washing and recrystallization.

The following examples are illustrative of the preparation of the active compounds of the present invention but are not to be construed as limiting.

*Example 1.—Salicylanilide Methylcarbamate*

Thirty-two grams of salicylanilide was dissolved in 1000 ml. of diethyl ether. Two ml. of triethylamine and 25 ml. of a 50% w./v. solution of methyl isocyanate in toluene were added to the solution and the reaction mixture was allowed to stand overnight at about 25° C. The resulting crystals of salicylanilide methylcarbamate were removed by filtration, washed with 100 ml. of diethyl ether, and dried in vacuo to provide 37.5 g. (92% yield) of salicylanilide methylcarbamate having a melting point of 160–161° C.

Analysis.—Calcd. for $C_{15}H_{14}N_2O_3$: C, 66.65; H, 5.22; N, 10.30. Found: C, 66.76; H, 5.22; N, 10.60.

*Example 2.—4'-Chlorosalicylanilide Methylcarbamate*

Following the procedure of Example 1, but substituting 0.1 mole of 4'-chlorosalicylanilide for salicylanilide gave 4'-chlorosalicylanilide methylcarbamate having a melting point of 159–161° C.

Analysis.—Calcd. for $C_{15}H_{13}ClN_2O_3$: C, 59.12; H, 4.30; N, 9.20; Cl. 11.64. Found: C, 59.19; H, 4.25; N, 9.01; Cl. 11.82.

*Example 3.—4'-Methylsalicylanilide Methylcarbamate*

Following the procedure of Example 1, but substituting 0.1 mole of 4'-methylsalicylanilide for salicylanilide gave 4'-methylsalicylanilide methylcarbamate having a melting point of 154–155.5° C.

Analysis.—Calcd. for $C_{16}H_{16}N_2O_3$: C, 67.59; H, 5.67; N, 9.86. Found: C, 67.68; H, 5.57; N, 9.57.

*Example 4.—4'-Methoxysalicylanilide Methylcarbamate*

Following the procedure of Example 1, but substituting 0.1 mole of 4'-methoxysalicylanilide for salicylanilide gave 4'-methoxysalicylanilide methylcarbamate having a melting point of 158–160° C.

Analysis.—Calcd. for $C_{16}H_{16}N_2O_4$: C, 63.99; H, 5.37; N, 9.33. Found: C, 64.02; H, 5.32; N, 9.14.

*Example 5.—3-Chlorosalicylanilide Ethylcarbamate*

Following the procedure of Example 1, but substituting 0.1 mole of 3-chlorosalicylanilide for salicylanilide and 0.1 mole of ethyl isocyanate for methyl isocyanate, 3-chlorosalicylanilide ethylcarbamate is obtained.

Example 6.—3-Bromosalicylanilide Ethylcarbamate

Following the procedure of Example 1, but substituting 0.1 mole of 3-bromosalicylanilide for salicylanilide and 0.1 mole of ethyl isocyanate for methyl isocyanate, 3-bromosalicylanilide ethylcarbamate is obtained.

Example 7.—4-Methylsalicylanilide Propylcarbamate

Following the procedure of Example 1, but substituting 0.1 mole of 4-methylsalicylanilide for salicylanilide and 0.1 mole of propyl isocyanate for methyl isocyanate, 4-methylsalicylanilide propylcarbamate is obtained.

Example 8.—2',3-Dichlorosalicylanilide Propylcarbamate

Following the procedure of Example 1, but substituting 0.1 mole of 2',3-dichlorosalicylanilide for salicylanilide and 0.1 mole propyl isocyanate for methyl isocyanate, 2',3-dichlorosalicylanilide propylcarbamate is obtained.

Example 9.—2',3-Difluorosalicylanilide Isopropylcarbamate

Following the procedure of Example 1, but substituting 0.1 mole of 2',3-difluorosalicylanilide for salicylanilide and 0.1 mole of isopropyl isocyanate for methyl isocyanate, 2',3-difluorosalicylanilide isopropylcarbamate is obtained.

Example 10.—2',3-Dichloro-4,4'-Diethylsalicylanilide Isopropylcarbamate

Following the procedure of Example 1, but substituting 0.1 mole of 2',3-dichloro-4,4'-diethylsalicylanilide for salicylanilide and 0.1 mole isopropyl isocyanate for methyl isocyanate, 2',3-dichloro-4,4-diethylsalicylanilide isopropylcarbamate is obtained.

Example 11.—2'-Chloro-5-Ethoxysalicylanilide Butylcarbamate

Following the procedure of Exampl 1, but substituting 0.1 mole of 2'-chloro-5-ethoxysalicylanilide for salicylanilide and 0.1 mole of butyl isocyanate for methyl isocyanate, 2'-chloro-5-ethoxysalicylanilide butylcarbamate is obtained.

Example 12.—4',5-Dimethoxysalicylanilide Butylcarbamate

Following the procedure of Example 1, but substituting 0.1 mole of 4',5-dimethoxysalicylanilide for salicylanilide and 0.1 mole of butyl isocyanate for methyl isocyanate, 4',5-dimethoxysalicylanilide butylcarbamate is obtained.

Example 13.—3,3'-Dibromo-5,5'Dimethoxysalicylanilide Isobutylcarbamate

Following the procedure of Example 1, but substituting 0.1 mole of 3,3'-dibromo-5,5'-dimethoxysalicylanilide for salicylanilide and 0.1 mole of isobutyl isocyanate for methyl isocyanate, 3,3'-dibromo-5,5'-dimethoxysalicylanilide isobutylcarbamate is obtained.

Example 14.—2',3-Dibromo-4,4'-Dimethylsalicylanilide Isobutylcarbamate

Following the porcedure of Example 1, but substituting 0.1 mole of 2',3-dibromo-4,4'-dimethylsalicylanilide for salicylanilide and 0.1 mole of isobutyl isocyanate for methyl isocyanate, 2',3-dibromo-4,4-dimethylsalicylanilide isobutylcarbamate is obtained.

Example 15.—3-Iodosalicylanilide Allylcarbamate

Following the procedure of Example 1, but substituting 0.1 mole of 3-iodosalicylanilide for salicylanilide and 0.1 mole of allyl isocyanate for methyl isocyanate, 3-iodosalicylanilide allylcarbamate is obtained.

Example 16.—3,5-Dibromosalicylanilide Methallyl carbamate

Following the procedure of Example 1, but substituting 0.1 mole of 3,5-dibromosalicylanilide for salicylanilide and 0.1 mole of methallyl isocyanate for methyl isocyanate, 3,5-dibromosalicylanilide methallylcarbamate is obtained.

Example 17.—4'-Methoxy-5-Methylsalicylanilide Crotylcarbamate

Following the procedure of Example 1, but substituting 0.1 mole of 4'-methoxy-5-methylsalicylanilide for salicylanilide and 0.1 mole of crotyl isocyanate for methyl isocyanate, 4'-methoxy-5-methylsalicylanilide crotylcarbamate is obtained.

Example 18.—3-Chloro-3',5'-Dimethylsalicylanilide Crotylcarbamate

Following the procedure of Example 1, but substituting 0.1 mole of 3-chloro-3',5'-dimethylsalicylanilide for salicylanilide and 0.1 mole of crotyl isocyanate for methyl isocyanate, 3 - chloro - 3',5'-dimethylsalicylanilide crotylcarbamate is obtained.

The compounds of the invention have demonstrated anti-inflammatory activity as demonstrated by the granuloma pouch technique in rats.

The compounds of the present invention are useful in the preparation of a variety of pharmaceutical composition. Preferably the compositions are prepared in unit dosage form, i.e., each unit containing a predetermined amount of the therapeutic compound of the present invention, for oral, parenteral and topical administration. For oral administration the compositions can take the form of tablets, capsules, boluses, pills, granules feeds, syrups, elixirs, and the like. Topical administration can be in the form of ointments, creams, sprays, solutions, suspensions, and powders. For parenteral administration sterile solutions and suspensions can be prepared in vehicles containing water, ethanol, glycerol, propylene glycol, polyalkylene glycols, vegetable oils, and the like.

The compositions, in the appropriate form, can be administered orally and parenterally for systemic treatment, applied topically for local treatment, or administered parenterally for local treatment such as injection into the joint cavity, tendon sheath, and bursa.

The compositions provide the veterinarian with a method for treating inflammation in large and small animals as well as birds and poultry. The animals and birds can be commercial animals raised for profit as well as animals kept for pets or research. Inflammatory conditions which can be treated include, but are not limited to, enteritis, iritis, retained placenta, laminitis, rheumatoid and traumatic arthritis, osteoarthritis, periostitis, tendonitis, tenosynovitis, bursitis and myositis.

The dosage of the compounds of the present invention depends upon the particular subject treated and the subject's age, weight and condition, as well as the particular condition being treated, its severity and route of administration. In general a dose of 3 mg. to 45 mg. per kg. of body weight given daily in single or divided doses, or 250 to 3000 mg. per day, embraces the effective therapeutic dosage for most conditions for which the said compounds are effective.

Advantageously the compounds of the present invention do not have the undesirable side-effects encountered with steroid and other types of anti-inflammatory agents. For example, there is no marked water, sodium or potassium retention nor is there the development of gastric ulceration or other distress.

For insecticidal use the compounds of the invention can be formulated into compositions adapted to insecticidal use.

The following examples illustrate the preparation of pharmaceutical dosage forms but are not to be considered as limiting.

Example 19

One thousand scored tablets for oral administration, each containing 500 mg. of salicylanilide methylcarbamate are prepared from the following types and amounts of ingredients:

| | Gm. |
|---|---|
| Salicylanilide methylcarbamate | 500 |
| Lactose | 150 |
| Corn starch | 65 |
| Magnesium stearate | 25 |
| Light liquid petrolatum | 3 |

The ingredients are thoroughly mixed and slugged. The slugs are broken down by forcing through a screen and the resulting granules are then compressed into tablets, each tablet containing 0.5 gm. of salicylanilide methylcarbamate.

Following the above formulation, 100 boluses for large animal use are similarly prepared, by enlarging the tablet size ten times, each bolus containing 5000 mg. of salicylanilide methylcarbamate.

Example 20

One thousand cc. of a sterile aqueous suspension for intramuscular administration and containing 250 mg. of carbamate per cc. is prepared from the following types and amounts of ingredients:

| | Gm. |
|---|---|
| Salicylanilide methylcarbamate | 250 |
| Polyethylene glycol 4000, U.S.P. | 30 |
| Procaine hydrochloride | 20 |
| Myristyl gamma picolinium chloride | 0.2 |
| Water for injection, q.s. 1000 cc. | |

Example 21

One thousand cc. of an aqueous syrup suspension for oral administration containing 500 mg. of salicylanilide methylcarbamate in each 5 cc. dose is prepared from the following types and amounts of ingredients:

| Salicylanilide methylcarbamate | gm | 100 |
|---|---|---|
| Citric acid | gm | 2 |
| Benzoic acid | gm | 1 |
| Sucrose | gm | 700 |
| Tragacanth | gm | 5 |
| Lemon oil | cc | 2 |
| Deionized water, q.s. 1000 cc. | | |

The citric acid, benzoic acid, sucrose, tragacanth, and lemon oil are dispersed in sufficient water to make 850 cc. of solution. The carbamate, finely divided, is stirred into the syrup until uniformly distributed. Sufficient water is added to make 1000 cc.

The syrup can be administered to small animals, 60 to 100 lb., at a teaspoonful dosage. For large animals such as a horse, one to two ounces of the composition can be diluted with milk or water to make 12 ounces administered as a drench.

Example 22

500 lb. of a composition for feeding turkeys with enteritis are prepared from the following types and amounts of ingredients:

| Salicylanilide methylcarbamate | gm | 25 |
|---|---|---|
| Ground oats | lb | 30 |
| Meat and bone scraps 50%[1] | lb | 30 |
| Fish meal 60%[1] | lb | 20 |
| Alfalfa meal, dehydrated 17%[1] | lb | 30 |
| Ground corn | lb | 158 |
| Wheat bran | lb | 15 |
| Wheat std. midds | lb | 30 |
| Soybean oil meal 50%[1] | lb | 150 |
| Dicalcium phosphate | lb | 9.5 |
| Calcium carbonate | lb | 14 |
| Trace mineralized salt | lb | 2.5 |
| Yellow fat | lb | 10 |
| Vitamin D premix | lb | 0.3 |
| B-vitamin supplement | lb | 0.45 |
| Trace mineral premix | lb | 0.3 |

[1] The percentages refer to the percent of protein present.

Example 23

Following the procedure of the preceding Examples 19 to 22, inclusive, compositions are similarly prepared substituting an equal amount of a compound prepared according to Examples 2 to 18, inclusive, for the salicylanilide methylcarbamate shown.

What is claimed is:

1. A compound of the formula:

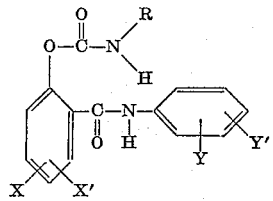

wherein R is a member selected from the group consisting of alkyl of from 1 to 4 carbon atoms inclusive; and alkenyl of from 3 to 4 carbon atoms inclusive; X and X' are members selected from the group consisting of hydrogen, halogen, alkyl of from 1 to 4 carbon atoms inclusive, and alkoxy of from 1 to 4 carbon atoms inclusive; and Y and Y' are members selected from the group consisting of hydrogen, halogen, alkyl of from 1 to 4 carbon atoms inclusive, and alkoxy of from 1 to 4 carbon atoms inclusive.

2. Salicylanilide methylcarbamate.
3. 4'-methylsalicylanilide methylcarbamate.
4. 4'-methoxysalicylanilide methylcarbamate.
5. 4'-chlorosalicylanilide methylcarbamate.

References Cited in the file of this patent

UNITED STATES PATENTS

| 2,703,332 | Bindler et al. | Mar. 1, 1955 |
|---|---|---|
| 2,855,436 | Rekker | Oct. 7, 1958 |